Dec. 23, 1958 S. M. ZIMMERMAN 2,865,989

TELEVISION CAMERA VIDEO AMPLIFIER AND BLANKING CIRCUITS

Filed June 25, 1956

Samuel M. Zimmerman
INVENTOR

BY Ernest A. Wood
ATTORNEY

United States Patent Office 2,865,989

Patented Dec. 23, 1958

2,865,989

TELEVISION CAMERA VIDEO AMPLIFIER AND BLANKING CIRCUITS

Samuel M. Zimmerman, Dallas, Tex.

Application June 25, 1956, Serial No. 593,417

5 Claims. (Cl. 178—7.2)

Figure 1:
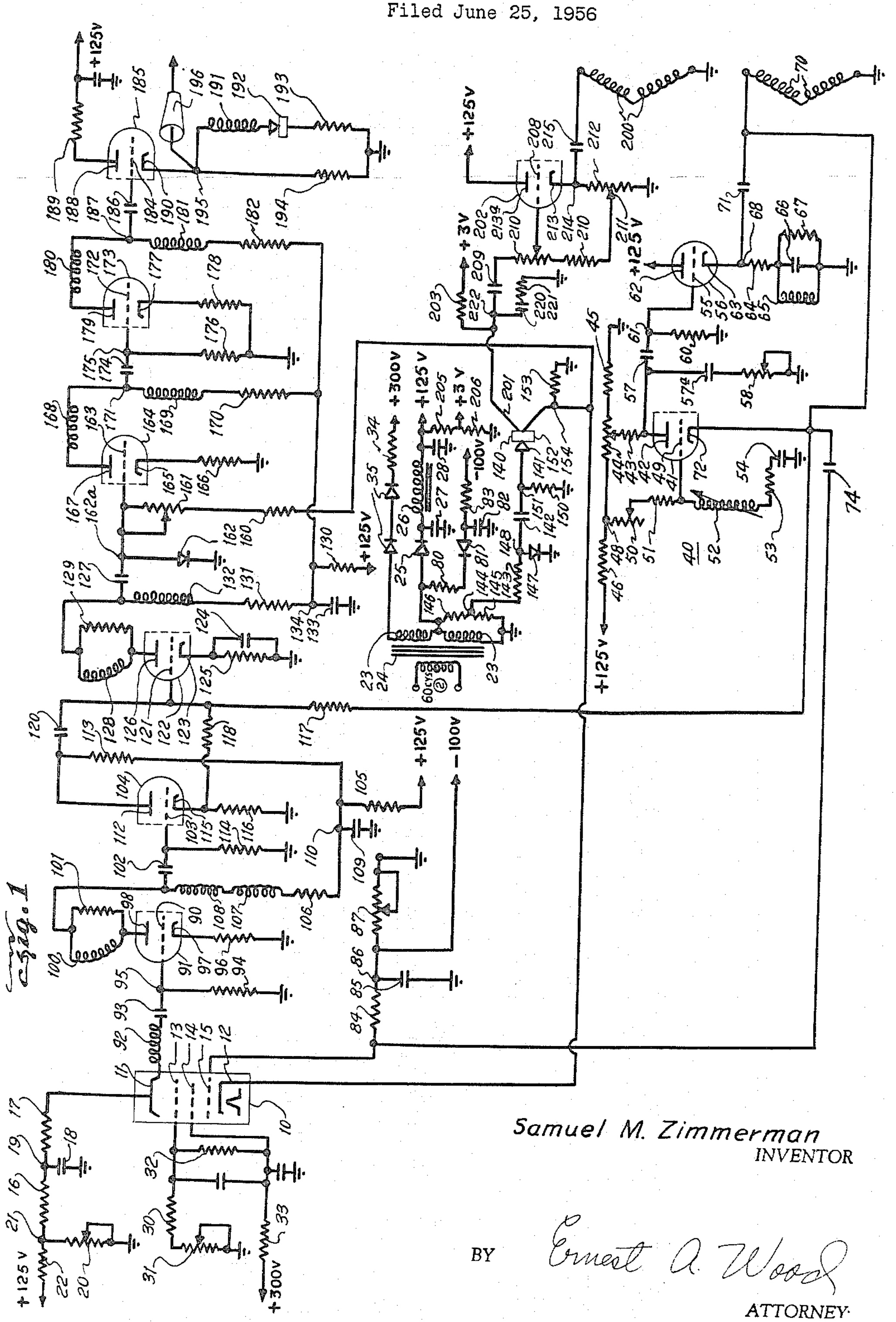

This invention relates to television control circuits and more particularly to a control circuit for a television camera.

An object of this invention is to provide a new and improved control circuit for a television camera.

Another object of the invention is to provide a new and improved control circuit for a television camera employing a vidicon tube.

Still another object of the invention is to provide a new and improved control circuit for a television camera utilizing a minimum number of vacuum tubes.

Still another object of the invention is to provide a new and improved control circuit for a television camera wherein the vertical sweep signal is derived from the sixty cycle alternating current input by the use of a three element transistor which creates the required saw toothed wave.

A further object of the invention is to provide a new and improved control circuit of the type described above wherein an effective brightness control is provided by connecting the vertical blanking circuit to the video signal circuit.

Still another object of the invention is to provide a new and improved control circuit, of the type described above, wherein a direct current blocking capacitor connected in the video signal amplifying circuit is connected to the vertical blanking circuit in order that its effective charge may be varied by the strength of the signal it receives from the vertical blanking circuit in order to achieve the desired brightness or intensity control.

Other objects will become manifest in the course of the following description when considered with the annexed drawing:

The single figure of the drawing is a schematic illustration of the control circuit for a television camera which embodies the invention.

Referring now to the drawing, the control circuit includes a vidicon tube 10, which includes the usual target electrode 11, cathode 12, a focus electrode 13, a grid 14, which is connected to a source of fixed potential, and a grid 15 on which is impressed a horizontal blanking signal. A light sensitive layer, not shown, adjacent to the target electrode 11 provides a source of free electrons at various points of the target electrode 11 to vary the conductivity of the vidicon tube 10, in accordance with the intensity of the light at various points of the light sensitive layer. The target electrode 11 is connected to a source of direct current voltage through a filter which includes a resistance 16, connected in series with a target load resistance 17, and a capacitor 18, connected between the ground and the juncture 19 of the two resistances 16 and 17. A target voltage control variable resistor 20 is connected at the common juncture or connection 21 of the resistance 16 and a resistance 22 whose other side is connected to the mid-point of a secondary winding 23 of a transformer 24, through a half-wave selenium rectifier 25, and a filter which comprises an inductance 26 and capacitors 27 and 28. The focus electrode 13 is connected to ground through a fixed resistance 30 and a variable resistance 31, and to a source of direct current voltage to resistances 32, 33 and 34, which are connected in series to one end of the secondary winding 23 through the half-wave rectifiers 35. A horizontal blanking pulse is imposed on the control grid 15 of the vidicon tube which is generated by an oscillator circuit 40, which includes an electric discharge device 41 having an anode 42, connected to a source of direct current voltage through a resistance 43, a variable resistance 44, a fixed resistance 46, and thence to the mid-point of the secondary winding 23 of the transformer 24 through the rectifier 25. The connection or junction 48 of the variable resistance 44 and the fixed resistance 46 is connected to the grid 49 of the electric discharge means 41 through a variable resistance 50 and a fixed resistance 51. The control grid 49 is also connected to ground through a variable inductance 52, a resistance 53 and a capacitor 54. The anode 42 is also connected to ground through a portion of the variable resistance 44 and a fixed resistance 45.

The output of the oscillator electric discharge means 41 is connected to the control grid 55 of an amplifier electric discharge means 56 through a blocking or coupling capacitor 57. A capacitor 57*a* and a variable resistance 58 are connected across the plate circuit of the oscillator electric discharge means 41 to provide a saw toothed pulse output from the oscillator electric discharge means 41. A resistance 60 is connected to the common juncture or connection 61 of the capacitor 57 and the control grid 55 of the amplifier electric discharge means 56. The anode 62 of the amplifier electric discharge means 56 is connected to the mid-point of the secondary winding 23 through the half wave rectifier 25. The cathode 63 of the amplifier electric discharge means 56 is connected to ground through a resistance 64 and a focus coil 65 of the vidicon tube 10, the capacitor 66, and a resistor 67. The output of the amplifier means 56 is derived from the point 68 since the cathode follower circuit is necessary to provide a low impedance source to the horizontal yoke coils 70 of the vidicon tube 10. The oscillator electric discharge means thus provides a horizontal sweep signal to the horizontal coils. The cathode 63 of the amplifier discharge means 56 is connected to the horizontal yoke coils 70 through a capacitor 71.

The cathode 63 is also coupled or connected to the cathode 72 of the oscillator electric discharge means 41 through the capacitor 71 to provide feed back thereto. The cathode 63 is also connected through the capacitor 71 and the capacitor 74 to the control grid 15 of the vidicon tube 10 to provide horizontal blanking of the video signal.

A negative bias is impressed upon the control grid 15 from the mid-point of the secondary winding 23 through a resistance 80, a half wave rectifier 81, a filter comprising a capacitor 82 and a resistance 83, and the current limiting resistance 84. A capacitor 85 is connected to the common connection or juncture 86 of the resistance 84 and a variable resistance 87 whose opposite side is connected to the ground.

The target electrode 11 of the vidicon tube 10 is connected to the control grid 90 of an amplifier electric discharge means 91 through a peaking coil or inductance 92 and a capacitor 93. A resistance 94 is connected between the common connection or juncture 95 of the capacitor 93 and the control grid 90 and its other side is connected to ground. The amplifier electric discharge means 91 is biased through a resistance 96 which is connected between the cathode 97 and ground. The anode 98 of the amplifier electric discharge means 91 is connected through a peaking network comprising an inductance 100 and a resistance 101 and a blocking condenser 102 to the control grid 103 of another amplifier electric discharge means 104. The anode 98 is connected to a source of direct current voltage through a resistance 105, a resistance 106 and a pair of series connected peaking inductances or coils 107 and 108. A capacitor 109 is connected to the common connection or junction 110 of the resistances 105 and 106. The anode 112 of the electric discharge means 104 is also connected to the source of direct current voltage through the resistance 105 and the resistance 113. The resistance 105 is connected to the mid-point of the secondary winding 23 through the halfwave rectifier 25. A resistance 114 is connected across the control grid 103 and the cathode 115 of the amplifier electric discharge means 104. A resistance 116 connects the cathode 115 to ground.

A horizontal synchronizing pulse from the cathode follower amplifier 56 is introduced into the cathode 115 circuit of the amplifier electric discharge means 104 through the resistances 117 and 118. The signal now produced by the amplifier electric discharge means 104 contains both the video signal and the horizontal blanking signal and the horizontal synchronizing signal. This composite signal is capacitively coupled to the control grid 121 of an amplifier electric discharge means 122 whose cathode 123 is connected to ground through a capacitor 124 which is shunted by a resistance 125. The anode 126 of the electric discharge means 122 is connected to one side of a capacitor 127 through a peaking circuit which includes an inductance 128 and a resistance 129 connected in parallel between the anode 126 and the capacitor 127. The anode 126 is connected to a source of direct current voltage through the resistance 130, the resistance 131, an inductance 132, and the peaking network which includes the inductance 128 and the resistance 129. A filter capacitor 133 is connected to the common connection or juncture 134 of the resistances 130 and 131. The resistance 130 is connected to the mid-point of the secondary winding 23 through the half wave rectifier 25.

A three element transistor 140 is employed to provide the vertical sweep signal. The emitter element 141 of the transistor 140 is connected through a capacitor 142 and a resistance 143 to the common connection 144 of a pair of resistances 145 and 146 which are connected in series across one half of the secondary winding 23 of the power transformer 24. A halfwave rectifier 147 is connected to the common connection or juncture 148 of the resistance 143 and the capacitor 142 whereby a 60 cycle pulsating D. C. voltage is applied to the emitter element 141 of the transistor 140. A resistance 150 is connected to the common connection or juncture 151 of the capacitor 142 and emitter element 141.

The base 152 of the transistor 140 is connected to ground through a resistance 153. A saw tooth pulse is thus developed across the resistance 153. The common connection 154 of the base 152 and the resistance 153 is connected to the cathode 12 of the vidicon tube 10 to provide a vertical blanking signal. The common connection 154 is also connected through a fixed resistance 160 and a variable resistance 161 to one side of the coupling capacitor 127 which thus can be charged to a higher value than it would be normally charged by the video signal from the amplifier electric discharge means 122. Thus by varying the variable resistance 161 the bias voltage developed by the capacitor 127 may be varied to achieve an effective brightness control. A germanium diode 162 is connected to the common connection 162*a* of the capacitor 127 and the variable resistance 161 to act as a direct current restorer.

The composite signal is fed to the control grid 163 of an electric discharge means 164 since the common connection 162*a* is connected to the control grid 163. The cathode 165 of the amplifier electric discharge means 164 is connected to ground through the resistance 166. The anode 167 of the amplifier electric discharge means 164 is connected to a source of positive direct current voltage through the inductances 168 and 169 and the resistances 170 and 130. The common connection or juncture 171 of the inductances 168 and 169 is connected to the control grid 172 of another amplifier electric discharge means 173 through a blocking capacitor 174. The common connection or juncture 175 of the control grid 172 and the capacitor 174 is connected to ground through the resistance 176. The cathode 177 of the electric discharge means 173 is connected to ground through the resistance 178. The anode 179 of the amplifier electric discharge means 173 is connected to a source of direct current voltage through the inductances 180 and 181 and the resistances 182 and 130.

The output of the amplifier electric discharge means 173 is fed to the control grid 184 of the electric discharge means 185 through a capacitor 186 one of whose sides is connected to the common juncture or connection 187 of the inductances 180 and 181. The anode 188 of the electric discharge means 185 is connected to the mid-point of the secondary winding 23 through a resistance 189 and the half wave rectifier 25. The cathode 190 of the electric discharge means 185 is connected to ground through a termination network consisting of a peaking coil or inductance 191 connected in series with a diode 192 and a resistance 193 across which is connected a resistance 194. The common connection 195 of the cathode 190 and the termination network is connected to the video output 196. It will be apparent that the electric discharge means 185 is employed as a portion of a cathode follower type amplifier.

The vertical yoke coils 200 are provided with a vertical sweep signal from the collector element 201 of the transistor 140 through an amplifier electric discharge means 202. A low value direct current voltage is applied to the collector 201 of the transistor through a resistance 203 which is connected to a voltage divider network or bridge which includes the resistances 205 and 206 connected in series across one half of the secondary winding 23 through the half wave rectifier 25. The collector element 201 is connected to the control grid 208 of the amplifier electric discharge means 202 through a blacking capacitor 209 and a portion of the variable resistance 210 which is connected in series between the capacitor 209 and the fixed resistance 210. The other side of the fixed resistance 210 is connected to the movable contact 211 of the variable resistance 212 connected between the cathode 213 of the electric discharge means 202 and ground. The anode 213*a* of the electric discharge means 202 is connected to a source of direct current voltage through the half wave rectifier 25. The common connection juncture 214 of the cathode 213 and the resistance 212 is connected to the vertical yoke coils 200 through a capacitor 215. It will be apparent that the electric discharge means 202 is employed in a cathode follower circuit to provide a low impedance source for the vertical yoke coils 200. A capacitor 220 and a resistance 221 are connected between ground and the juncture 222 between the capacitor 209 and the collector element 201 of the transistor 140. The capacitor 220 is charged by the transistor 140 and when it is charged to a given value the transistor discharges.

In order to provide a control circuit having a minimum number of tubes, various of the tubes can be of the double triode type which are contained in a single envelope. For example, the electric discharge means 91 and 104 may be a double triode tube contained in a single envelope. The electric discharge means 122 and 164 may also be a double triode tube contained in a single envelope. Tubes of this type, used for the amplification of the video signal generated by the vidicon tube, provide a high gain, wide band, noise free video amplifier in conjunction with the dual peak, low value plate load resistance circuit described above. The electric discharge means 173 and 202 may also be a double triode tube contained in a single envelope. Similarly, the electric discharge means 185 and the electric discharge means 41 may be a dual triode type tube such as a 12BH7 tube.

It will now be apparent that a new and improved control circuit for a television camera employing a vidicon tube has been illustrated and described. It will also be apparent that the use of a number of dual triode tubes provides a control circuit that requires a minimum number of tubes. It will be apparent that the new and improved controlled circuit for the television camera employs a three element transistor energized directly from a 60-cycle alternating current input to create a vertical sweep signal having the required saw toothed wave. It will also be apparent that the vertical blanking circuit of the television control circuit is employed to provide a means for varying the effective charge on a direct current blocking capacitor connected in a video amplifying circuit of the camera to achieve the desired brightness or intensity control.

Manifestly, the construction as shown and described is capable of some modification and such modification as may be construed to fall within the scope and meaning of the appended claims is also considered to be within the spirit and intent of the invention.

What is claimed is:

1. A control circuit for a television camera comprising a light responsive device having a target electrode, a cathode and a plurality of control grids, vertical yoke coils and horizontal yoke coils for controlling the horizontal and vertical movement of the beam of the light sensitive device, oscillator means for generating a signal of desired frequency connected to the horizontal yoke coils, means connecting said oscillator means and one of the control grids of the light responsive device to provide horizontal blanking, means producing a sweep signal of predetermined frequency connected to the vertical yoke coils, said last mentioned means being connected to the cathode of the light responsive device to provide vertical blanking, and amplifier means connected between the target electrode of the light sensitive device and the output of the control circuit to amplify the video signal derived from the target electrode, said amplifying means including a blocking capacitor and means connecting the means for generating the sweep signal of desired frequency to the capacitor to vary the effective charge of the capacitor to obtain brightness control.

2. A control circuit for a television camera comprising a light responsive device having a target electrode, a cathode and a plurality of control grids, vertical yoke coils and horizontal yoke coils for controlling the horizontal and vertical movement of the beam of the light sensitive device, oscillator means for generating a signal of desired frequency connected to the horizontal yoke coils, means connecting said oscillator means and one of the control grids of the light responsive device to provide horizontal blanking, means producing a sweep signal of predetermined frequency connected to the vertical yoke coils, said last mentioned means being connected to the cathode of the light responsive device to provide vertical blanking, and amplifier means connected between the target electrode of the light sensitive device and the output of the control circuit to amplify the video signal derived from the target electrode, said amplifying means including a blocking capacitor and means connecting the means for generating the sweep signal of desired frequency to the capacitor to vary the effective charge of the capacitor to obtain brightness control, said last mentioned means comprising a variable resistance whereby the brightness of the video signal may be varied by adjustment of the variable resistance.

3. A control circuit for a television camera having a light sensitive electric discharge means comprising a target electrode, a cathode, and a plurality of control grids, vertical yoke coils and horizontal yoke coils comprising: means for producing a horizontal sweep signal of desired frequency connected to said horizontal yoke coils, said last mentioned means being connected to one of said control grids to impress a horizontal blanking signal thereon; means for producing a vertical sweep signal connected to the vertical coils, said means for producing a vertical sweep signal being connected to the cathode of the light sensitive electric discharge means to provide a vertical blanking signal impressed on the cathode; amplifying means connected between the target electrode of the light sensitive electric discharge means and the output of said control circuit which includes a direct current blocking capacitor, said means for producing a vertical sweep signal being connected to said capacitor to vary the effective charge of the capacitor whereby an effective brightness control of the video signal is obtained.

4. A control circuit for a television camera having a light sensitive electric discharge means comprising a target electrode, a cathode, and a plurality of control grids, vertical yoke coils and horizontal yoke coils comprising: means for producing a horizontal sweep signal of desired frequency connected to said horizontal yoke coils, said last mentioned means being connected to one of said control grids to impress a horizontal blanking signal thereon; means for producing a vertical sweep signal connected to the vertical coils, said means for producing a vertical sweep signal being connected to the cathode of the light sensitive electric discharge means to provide a vertical blanking signal impressed on the cathode; amplifying means connected between the target electrode of the light sensitive electric discharge means and the output of said control circuit which includes a direct current blocking capacitor, said means for producing a vertical sweep signal being connected to said capacitor to vary the effective charge of the capacitor whereby an effective brightness control of the video signal is obtained, said means for producing a vertical sweep signal comprising a three element transistor having an emitter connected to a source of alternating current through a capacitor which has one side connected to ground through a half-wave rectifier, a base element connected to ground through a resistance and a collector element connected to the vertical coils through an amplifier means, said base element also being connected to the cathode of the light sensitive electric discharge means and to one side of said capacitor.

5. A control circuit for a television camera having a light sensitive electric discharge means comprising a target electrode, a cathode, and a plurality of control grids, vertical yoke coils and horizontal yoke coils comprising: means for producing a horizontal sweep signal of desired frequency connected to said horizontal yoke coils, said last mentioned means being connected to one of said control grids to impress a horizontal blanking signal thereon; means for producing a vertical sweep signal connected to the vertical coils, said means for producing a vertical sweep signal being connected to the cathode of the light sensitive electric discharge means to provide a vertical blanking signal impressed on the cathode; amplifying means connected between the target electrode of the light sensitive electric discharge means and the output of said control circuit which includes a direct current blocking capacitor, said means for producing a vertical sweep signal being connected to said capacitor to vary the effective charge of the capacitor whereby an effective brightness control of the video signal is obtained, said means for producing a vertical sweep signal comprising a three element transistor having an emitter connected to a source of alternating current through a capacitor which has one side connected to ground through a half-wave rectifier, a base element connected to ground through a resistance and a collector element connected to the vertical coils through an amplifier means, said base element also being connected to the cathode of the light sensitive electric discharge means and to one side of said capacitor, and a variable resistance connected between said base element and said capacitor.

References Cited in the file of this patent

UNITED STATES PATENTS

| | | |
|---|---|---|
| 2,084,700 | Ogloblinsky | June 22, 1937 |
| 2,098,390 | Iams | Nov. 9, 1937 |
| 2,169,840 | Lewis et al. | Aug. 15, 1939 |
| 2,293,147 | Kell | Aug. 18, 1942 |